US012613941B1

(12) United States Patent
Zirpe et al.

(10) Patent No.: US 12,613,941 B1
(45) Date of Patent: Apr. 28, 2026

(54) SYSTEM, METHOD, AND COMPUTER PROGRAM FOR MULTI-STAGE MULTI-CLASS CLASSIFICATION

(71) Applicant: Amdocs Development Limited, Limassol (CY)

(72) Inventors: Sayali Zirpe, Maharashtra (IN); Alexander Murin, Rehovot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 662 days.

(21) Appl. No.: 18/095,958

(22) Filed: Jan. 11, 2023

(51) Int. Cl.
| | |
|---|---|
| *G06F 18/2415* | (2023.01) |
| *G06F 18/2431* | (2023.01) |
| *G06N 20/20* | (2019.01) |

(52) U.S. Cl.
CPC ...... *G06F 18/2415* (2023.01); *G06F 18/2431* (2023.01); *G06N 20/20* (2019.01)

(58) Field of Classification Search
CPC .. G06F 18/2415; G06F 18/2431; G06N 20/20
USPC ......................................................... 706/12
See application file for complete search history.

(56) References Cited

U.S. PATENT DOCUMENTS

| | | | |
|---|---|---|---|
| 2011/0270779 A1* | 11/2011 | Showalter ............ | G06Q 40/035 |
| | | | 705/36 R |
| 2022/0121633 A1* | 4/2022 | Quader ................. | G06F 16/213 |
| 2023/0049418 A1* | 2/2023 | Saha ..................... | G06N 3/0464 |
| 2023/0059674 A1* | 2/2023 | Kim ....................... | G06N 20/20 |

OTHER PUBLICATIONS

Wang, et al., "Multi-class arrhythmia detection based on neural network with multi-stage features fusion", 2019 IEEE international conference on system, man and cybernetics, Bari, Italy, Oct. 6-9, 2019 (Year: 2019).*
Wang, et al., "Multi-stage fusion for multi-class 3D lidar detection", ICCV 2021 (Year: 2021).*
Trapeznikov, et al., "Multi-stage classifier design", JMLR: Workshop and conference proceedings 25: 459-474, 2012 (Year: 2012).*
Kao, et al., "A multi-stage learning framework for intelligent system", Expert systems with applications 40 (2013) 3378-3388, 2012 (Year: 2012).*
Injadat, et al., "Multi-stage optimized machine learning framework for network intrusion detection", IEEE transactions on network and service manament, vol. 18, No. 2, Jun. 2021 (Year: 2021).*

* cited by examiner

*Primary Examiner* — Tsu-Chang Lee
(74) *Attorney, Agent, or Firm* — Zilka-Kotab, P.C.

(57) ABSTRACT

As described herein, a system, method, and computer program are provided for a multi-stage multi-class classification. A dataset having an imbalanced distribution of data across a plurality of classes is identified. The plurality of classes are grouped into a plurality of clusters, based on a defined criteria. A plurality of machine learning models are trained, each machine learning model of the plurality of machine learning models trained using a subset of the data in the dataset corresponding to a particular cluster of the plurality of clusters. The plurality of machine learning models are used, in stages, to predict a classification for a given input.

19 Claims, 5 Drawing Sheets

100

100

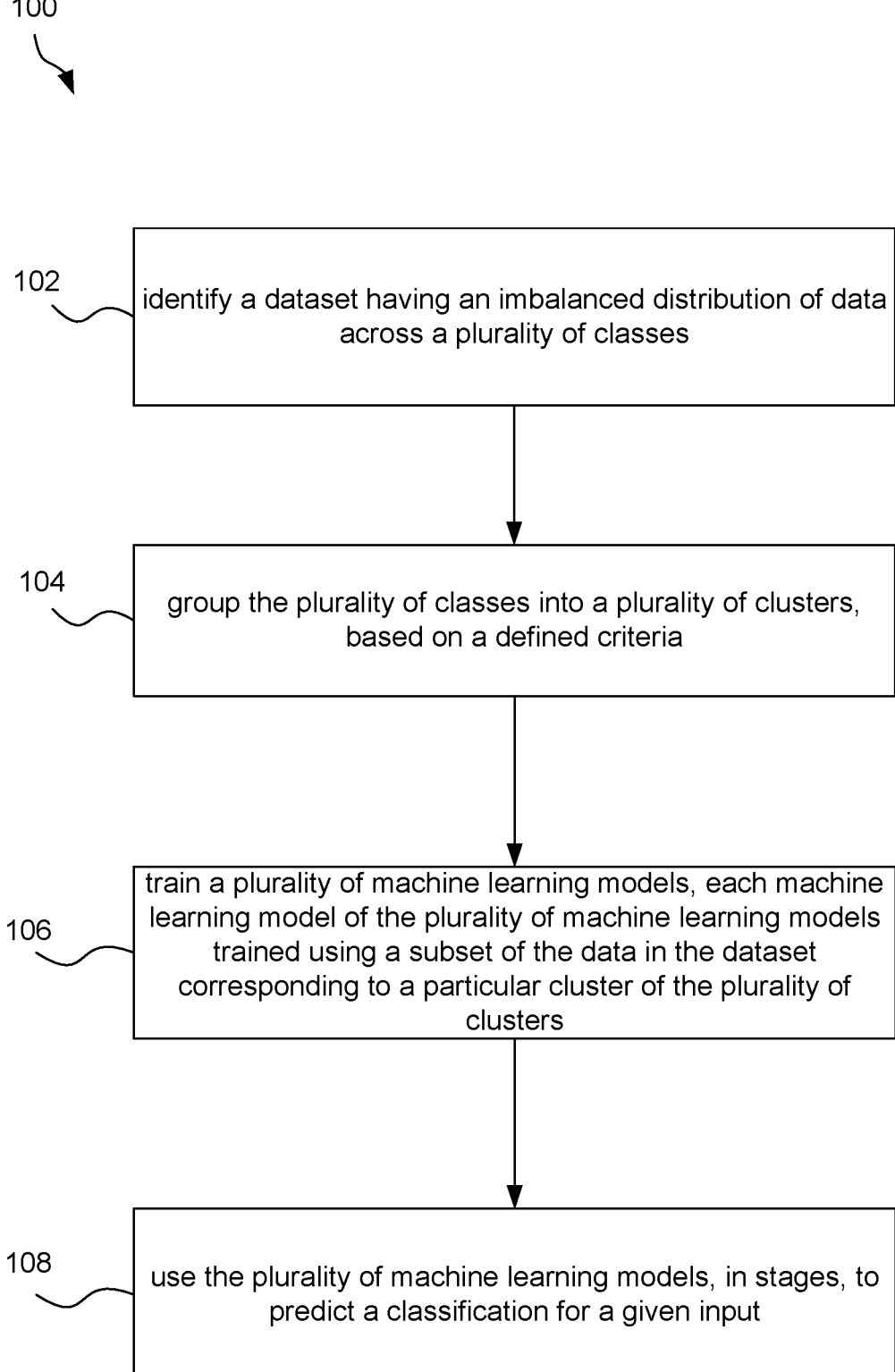

102 — identify a dataset having an imbalanced distribution of data across a plurality of classes 104 — group the plurality of classes into a plurality of clusters, based on a defined criteria 106 — train a plurality of machine learning models, each machine learning model of the plurality of machine learning models trained using a subset of the data in the dataset corresponding to a particular cluster of the plurality of clusters 108 — use the plurality of machine learning models, in stages, to predict a classification for a given input

FIG. 1

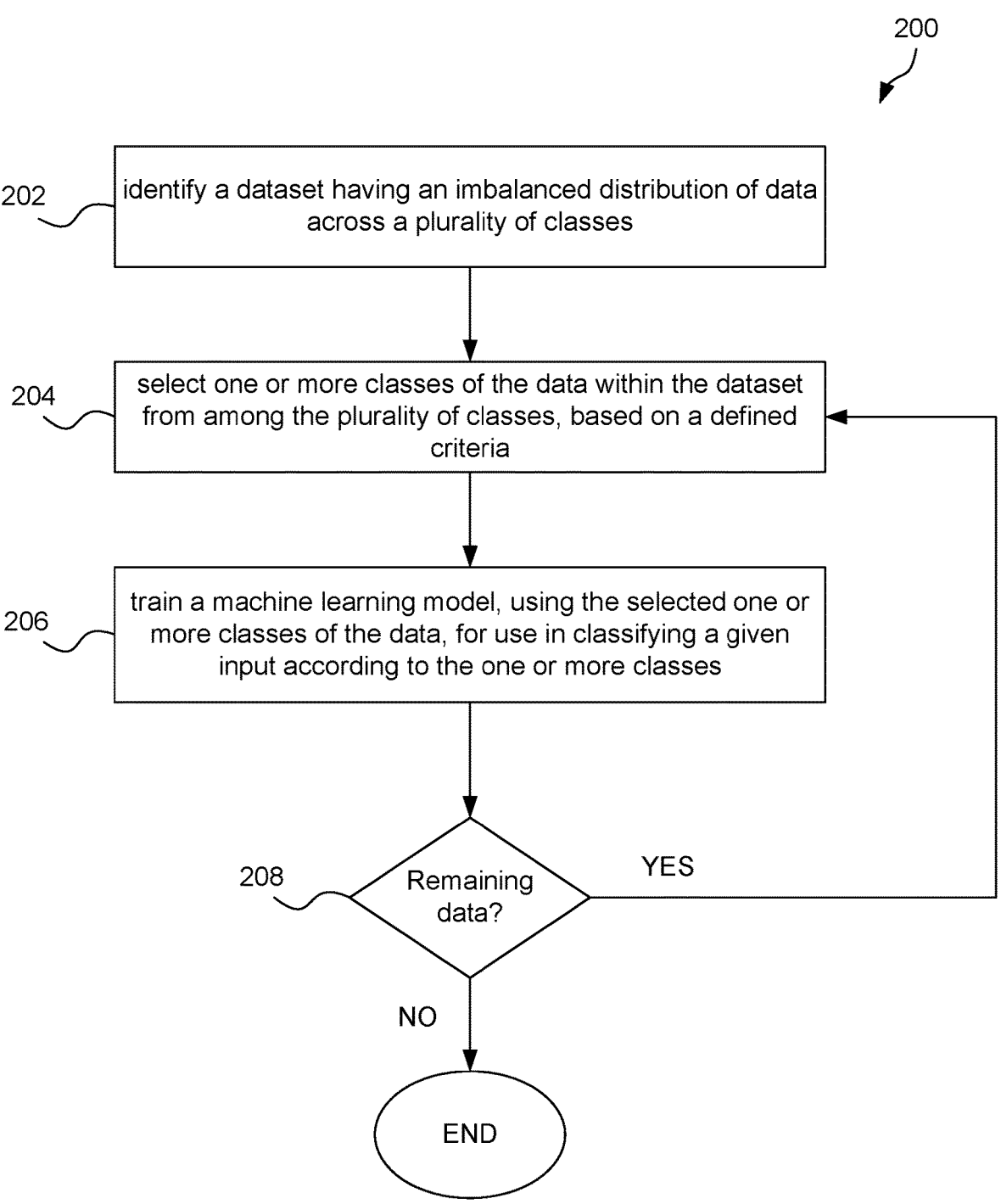

200

202   identify a dataset having an imbalanced distribution of data across a plurality of classes 204   select one or more classes of the data within the dataset from among the plurality of classes, based on a defined criteria 206   train a machine learning model, using the selected one or more classes of the data, for use in classifying a given input according to the one or more classes 208   Remaining data?   YES

NO

END

SERVER

412

TELEVISION

408

PDA

NETWORK(S)

402

406

COMPUTER

410

MOBILE
TELEPHONE

SYSTEM, METHOD, AND COMPUTER PROGRAM FOR MULTI-STAGE MULTI-CLASS CLASSIFICATION

FIELD OF THE INVENTION

The present invention relates to using machine models to make multi-class classifications.

BACKGROUND

Machine learning algorithms are configured to train a model from training data in order to be able to then process some input to make a prediction. These algorithms perform well on a relatively balanced dataset, but if the dataset used to train a model is imbalanced then the machine learning model's output will be more biased towards the majority classes included in that dataset, and will accordingly have poor predictive ability on the minority classes.

There is thus a need for addressing these and/or other issues associated with the prior art. For example, there is a need to provide a multi-stage approach for multiclass classification to handle imbalanced class distribution in a dataset.

SUMMARY

As described herein, a system, method, and computer program are provided for a multi-stage multi-class classification. A dataset having an imbalanced distribution of data across a plurality of classes is identified. The plurality of classes are grouped into a plurality of clusters, based on a defined criteria. A plurality of machine learning models are trained, each machine learning model of the plurality of machine learning models trained using a subset of the data in the dataset corresponding to a particular cluster of the plurality of clusters. The plurality of machine learning models are used, in stages, to predict a classification for a given input.

BRIEF DESCRIPTION OF THE DRAWINGS

FIG. 1 illustrates a method for a multi-stage multi-class classification, in accordance with one embodiment.

FIG. 2 illustrates a method for training a plurality of machine learning models by class clusters, in accordance with one embodiment.

DETAILED DESCRIPTION

Figure 3:
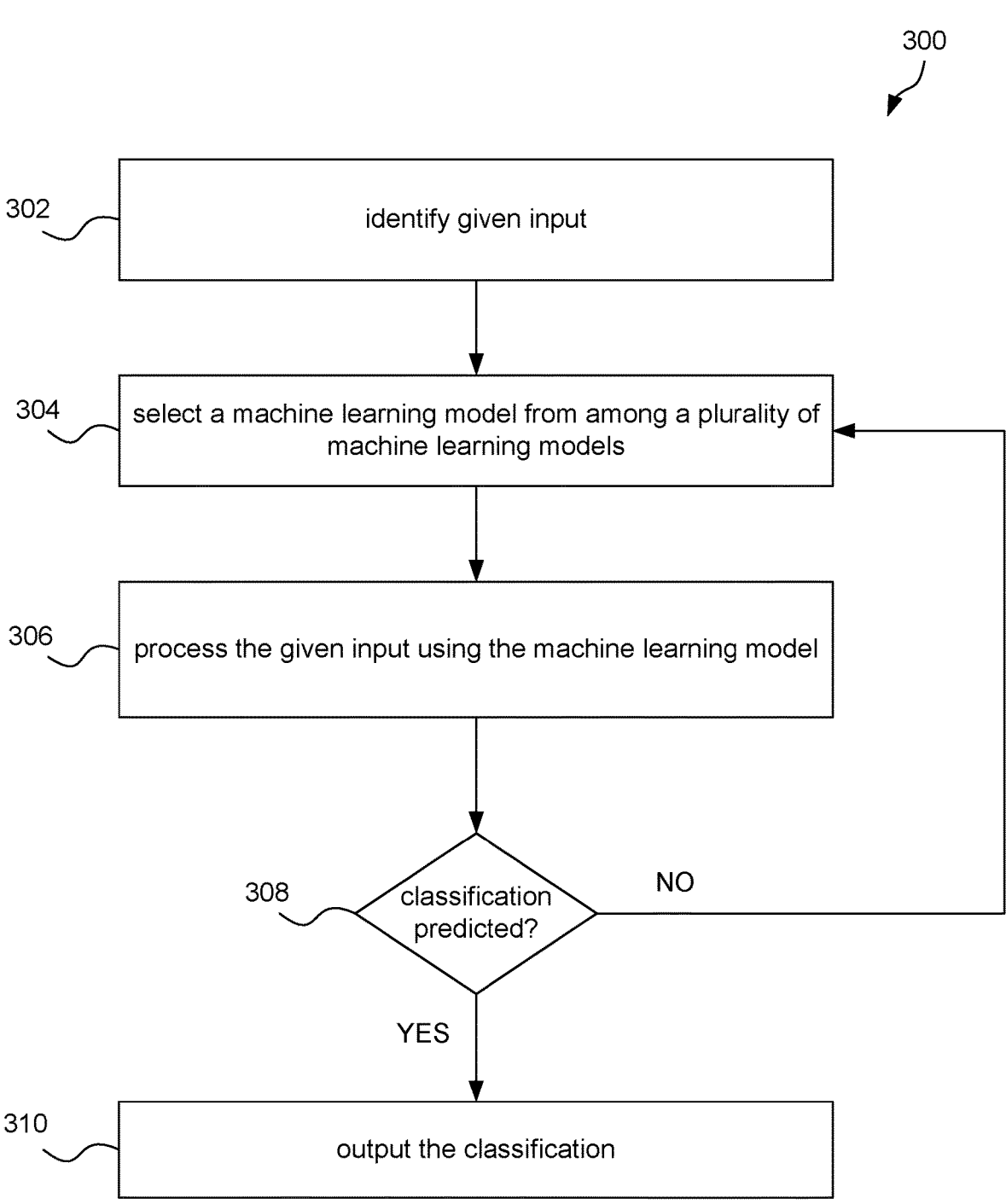
FIG. 3 illustrates a method for using a plurality of machine learning models in stages, in accordance with one embodiment.

FIG. 1 illustrates a method for a multi-stage multi-class classification, in accordance with one embodiment. The method 100 may be performed by any computer system described below with respect to FIGS. 4 and/or 5.

In operation 102, a dataset having an imbalanced distribution of data across a plurality of classes is identified. The classes refer to the classifications by which data in the dataset is classified. For example, each data entry (e.g. record, etc.) in the dataset may be classified according to one of a plurality of defined classes. With respect to the present description, an imbalanced distribution of data across the plurality of classes refers to at least one of the classes including an unproportional amount of data compared to the amount of data in the other classes.

In operation 104, the plurality of classes are grouped into a plurality of clusters, based on a defined criteria. Each cluster may include one or more classes of the plurality of classes, depending on the criteria used to group the classes. In an embodiment, the defined criteria may include an initial criteria that includes a class hierarchy, a class proportion, a frequency in a defined time period, and/or a logical similarity. In an embodiment, the defined criteria may also include an additional criteria that groups all remaining classes not grouped according to the initial criteria.

In an embodiment, the initial criteria may include the class hierarchy, where the plurality of classes are grouped according to major classes (i.e. classes predefined as being of more significance) and minor classes (i.e. classes predefined as being of less significance). In an embodiment, the initial criteria may include the class proportion, where the plurality of classes are grouped by similar size (i.e. with classes that are within a defined size range of one another being grouped together in a cluster). In an embodiment, the initial criteria includes the frequency in a defined time period, where the plurality of classes are grouped by similar frequency (i.e. with classes that have a frequency of data associated with the defined time period being grouped together in a cluster). In an embodiment, the initial criteria includes the logical similarity (i.e. with classes having a threshold level of logical similarity being grouped together in a cluster).

As mentioned above, the defined criteria may also include an additional criteria that groups all remaining classes not grouped according to the initial criteria. In this embodiment, a final cluster may include any remaining classes not grouped according to the initial criteria.

In an embodiment, the plurality of clusters may be ordered, depending on the defined criteria used to group the plurality of classes into the clusters. For example, the clusters may be ordered based on their respective class positions in the hierarchy (e.g. clusters with major classes ordered ahead of clusters with minor classes). As another example, the clusters may be ordered based on their respective class sizes (e.g. clusters ordered from largest class sizes to smallest class sizes). As yet another example, the clusters may be ordered based on their respective class frequencies (e.g. clusters ordered from greatest class frequency to smallest class frequency).

In operation 106, a plurality of machine learning models are trained, each machine learning model of the plurality of machine learning models trained using a subset of the data in the dataset corresponding to a particular cluster of the plurality of clusters. In other words, each machine learning model is trained using a different cluster of classes of the data in the dataset. Thus, each machine learning model may be trained to make classification predictions for the classes of data on which the model is trained.

In an embodiment, the grouping of operation 104 and the training of operation 106 may performed in stages. For example, in this embodiment, one or more classes of the data within the dataset may be selected from among the plurality of classes (i.e. to form a first cluster), based on the defined criteria (e.g. major classes, largest size classes, etc.). Then, a first machine learning model may be trained, using the selected one or more classes of the data, for use in classifying a given input according to the one or more classes. Further, for remaining data within the dataset not classified according to the one or more classes, the selecting and the training are repeated at least one additional time to form at least one second machine learning model for use in classifying the given input according to one or more additional classes.

In another embodiment, the grouping of operation 104 may be performed, and afterwards the training of operation 106 may performed. In this embodiment, all classes of the data in the dataset may be grouped into the clusters, and afterwards a machine learning model may be trained per cluster.

In operation 108, the plurality of machine learning models are used, in stages, to predict a classification for a given input. In an embodiment, the given input may be processed through the plurality of machine learning models, in stages, until the classification is predicted for the given input. For example, where the plurality of clusters are ordered, the plurality of machine learning models may then be used according to the order of the plurality of clusters from which the plurality of machine learning models were trained.

Still yet, the method 100 may include outputting the classification precited for the given input. To this end, instead of training a machine learning model from the dataset having the imbalanced distribution of data across the plurality of classes (where output of the machine learning model will be more biased towards the majority classes and have poor prediction on minority classes), a plurality of machine learning models may be trained from different clusters of classes, where each cluster includes one or more classes that are balanced with respect to one another (i.e. as determined based on the defined criteria, such as class size, class frequency, etc.). The machine learning models may then be used, in stages, to predict the classification for the given input. Thus, the aforementioned bias may be eliminated, and more accurate prediction may be provided.

This method 100 therefore automatically handles the class imbalance within the initial dataset without adding or removing the samples from the dataset, and further deals with a large number of classes of data. Prior art techniques to handle imbalanced dataset, such as oversampling the minority class or under sampling the majority class can induce bias and may impact the classification accuracy, and this can be eliminated by using the multistage approach of the method 100. This multi-staged method handles imbalanced sample distribution, and also can be extended and implemented to prioritize certain classes over others depending on their importance and for logical grouping of classes to improve accuracy.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a method 200 for training a plurality of machine learning models by class clusters, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In operation 202, a dataset having an imbalanced distribution of data across a plurality of classes is identified. The dataset may be generated as training data, for use in training machine learning models, as described below. The data included in the dataset may include any data labeled in accordance with the plurality of classes, such that the machine learning models may learn, in combination from the labeled data, to be able to predict which of the classes a given input belongs to.

In operation 204, one or more classes of data within the dataset are selected from among the plurality of classes, based on a defined criteria. The selected class(es) form a cluster. The defined criteria may include an initial criteria, applied during one or more iterations of the method 200, and then an additional criteria applied during a final iteration of the method 200.

In an embodiment, the criteria may be to select all of the classes predefined as major classes in a first iteration of the method 200, and then to select all classes predefined as minor classes in second iteration of the method 200.

In another embodiment, the criteria may be to select a class with a largest proportion of data within the dataset and to select any other of the classes having a proportion of data within the dataset that is within a predefined range of the class with the largest proportion of data within the dataset (such that classes with a predefined level of similarity in data proportion are selected together). In one or more subsequent iterations of the method 200, this same criteria may be applied to the unselected classes remaining after each iteration.

In another embodiment, the criteria may be to select a class with a highest frequency of data in a defined time period within the dataset and to select any other of the classes having a frequency of data in the defined time period within the dataset that is within a predefined range of the class with the highest frequency of data (such that classes with a predefined level of similarity in data frequency are selected together). In one or more subsequent iterations of the method 200, this same criteria may be applied to the unselected classes remaining after each iteration.

It should be noted that the embodiments described above, with respect to the different (initial) criteria that may be applied to group the classes of data, may be used in combination with one another, as desired. In another embodiment, an additional criteria may indicate to group all remaining classes in a final iteration of the method 200, when not able to be grouped according to the initial criteria mentioned above (i.e. when not meeting the initial criteria).

To this end, following operation 204, a cluster of classes of data is formed from the selected class(es). In operation 206, a machine learning model is trained, using the selected class(es), for use in classifying a given input according to the selected class(es). Thus, a machine learning model corresponding to the cluster formed in a first iteration of operation 204 may be created.

In decision 208, it is determined whether there is any remaining data in the dataset that is not included in the class(es) already used to train the machine learning model. When it is determined that there is such remaining data, then the method 200 returns to operation 204 to again select one or more classes of data within the dataset from among the plurality of remaining classes (not yet selected in a prior iteration of the method 200), based on the defined criteria.

Thus, each subsequent iteration of the method 200 may form a new cluster of classes, from which a new machine learning model is trained in operation 206. Once all data in the dataset has been used to train a machine learning model, the method 200 ends. To this end, the method 200 of the present embodiment operates to perform the grouping of operation 204 and the training of operation 206 in stages (iterations). The result of the method 200 may accordingly be a plurality of machine learning models, each trained from a different cluster of classes of data within the initial dataset.

FIG. 3 illustrates a method 300 for using a plurality of machine learning models in stages, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, a given input is identified. With respect to the present embodiment, the given input refers to a data input for which a classification is to be predicted. In operation 304, a machine learning model is selected from among a plurality of machine learning models. Each machine learning model refers to a model trained, using machine learning, on one or more classes of data to be able to predict a classification for a given input from among the one or more classes. Thus, each of the plurality of machine learning models may be trained on different clusters of classes of data.

The selected machine learning model may be a first machine learning model trained using method 200 of FIG. 2, in an embodiment. In another embodiment, the selected machine learning model may be a first machine learning model in an ordered set of machine learning models (e.g. with the order based on the order in which the classes were clustered).

In operation 306, the given input is processed using the (selected) machine learning model. In decision 308, it is determined whether a classification for the given input is predicted. In other words, it may be determined whether the machine learning model was able to classify the given input according to one of the classes of data on which the machine learning model has been trained. When the machine learning model is not able to classify the given input according to one of the classes of data on which the machine learning model has been trained, the machine learning model may predict the classification as "other" or with some other indicator that a classification has not been predicted.

When it is determined that a classification for the given input is not predicted for the given input by the machine learning model, the method 300 returns to operation 304 to select a next machine learning model (e.g. in order) and in operation 306 to process the given input using the next machine learning model. The method 300 will repeat operations 304-308 until a classification for the given input is predicted. Once the classification is determined to be predicted in decision 308, the classification is output, as shown in operation 310.

Exemplary Implementation of Methods 200-300

Let Model_i be the machine learning model trained on the i-th stage dataset, where i=1, . . . , n−1. Let Model_n be the machine learning model trained on the dataset of the classes grouped as 'Other' in the previous stage (n−1). The remaining minor classes are grouped under one class named 'Other'. The proportion of 'Other' is similar to the proportion of the major classes chosen before and of same class hierarchy to form a logical grouping.

In the next stage we use only the samples that are grouped under 'Other' in the previous stage. If the classes under 'Other' are also highly imbalanced, we repeat the process of selecting the major classes out of them and logically grouping the remaining classes as 'Other'.

Again, we will check the class distribution within 'Other' for imbalance. If the distribution is highly imbalanced then we will repeat the class selection and logical grouping as done previously, otherwise we will train the model on the samples previously grouped as 'Other' without the grouping.

To predict the class of a new sample, we will predict first with Model_1. If the prediction is not 'Other', we stop. Otherwise, we continue to predict with Model_2 and so on, until the sample gets a prediction of an ungrouped class (not 'Other').

Exemplary 2-Stage Implementation

In a 2 staged example n=2 we will have Model_1 and Model_2.

Assuming we have dataset and classes L1, L2, L3, L4, and L5, that have an imbalanced distribution. L1 and L2 are majority classes with relatively same sample proportion and L3, L4, L5 are minority classes.

All the samples with classes L3, L4, and L5 are grouped under the label 'Other'. We train Model_1 with three classes: L1, L2 and 'Other'. In the next stage we take only the samples with the class 'Other' and train Model_2 with classes L3, L4 and L5. A new sample will go through Model_1. If predicted L1 or L2 we stop. If predicted 'Other' the sample will go through Model_2 to get the final class prediction.

Use Case

The present embodiments described herein can be is used for auto triaging of defects in the development, testing and/or production environment for software. The embodiments may predict the application responsible for the defect, in order to properly resolve the defect.

The auto triage solution reduces communications between the development teams and provides a time optimized solution and better work force allocation. In a setting of defect management systems, a very large number of possible responsible applications may exist that have a highly imbalanced distribution of classes of data.

Figure 4:
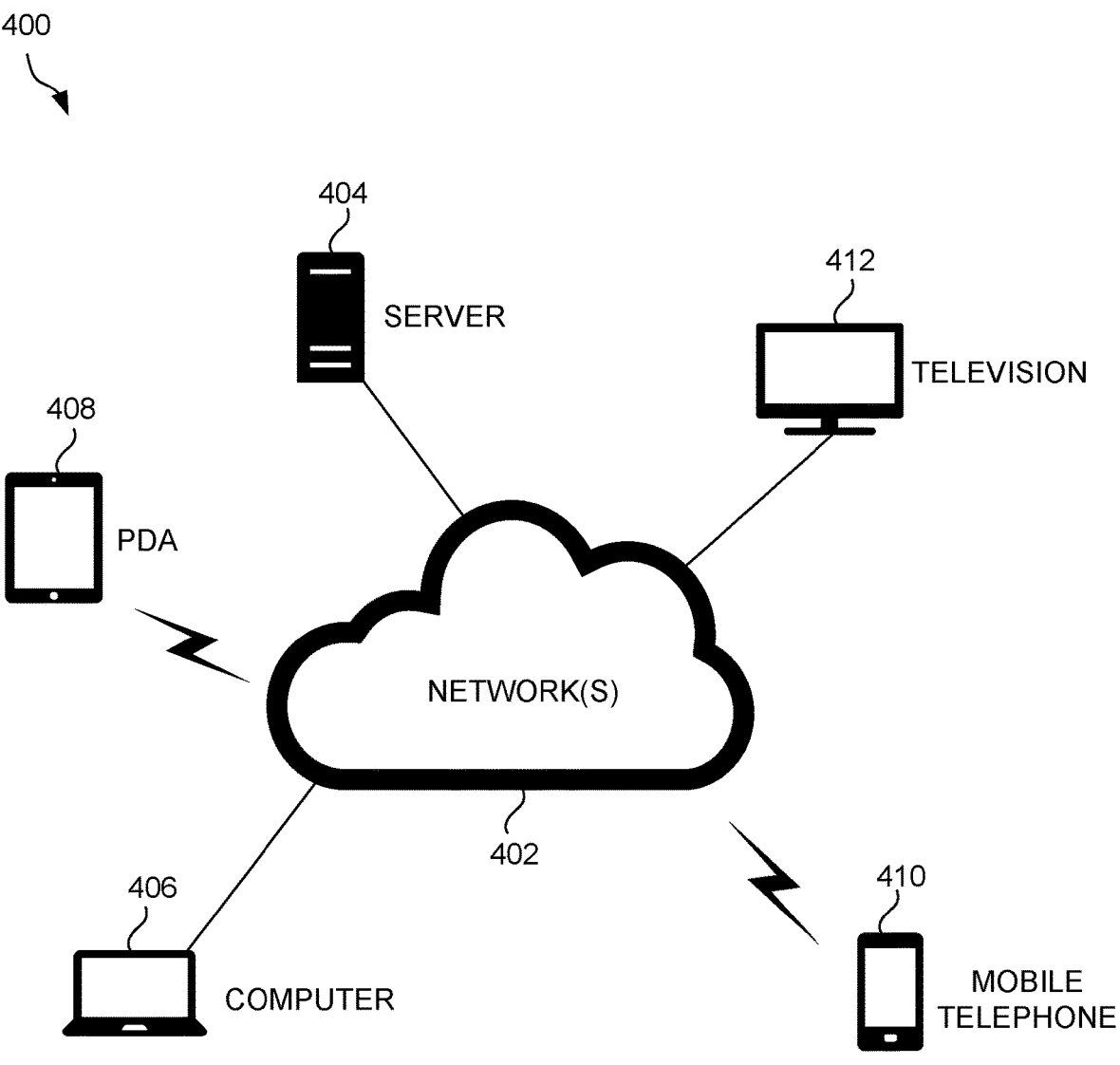
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
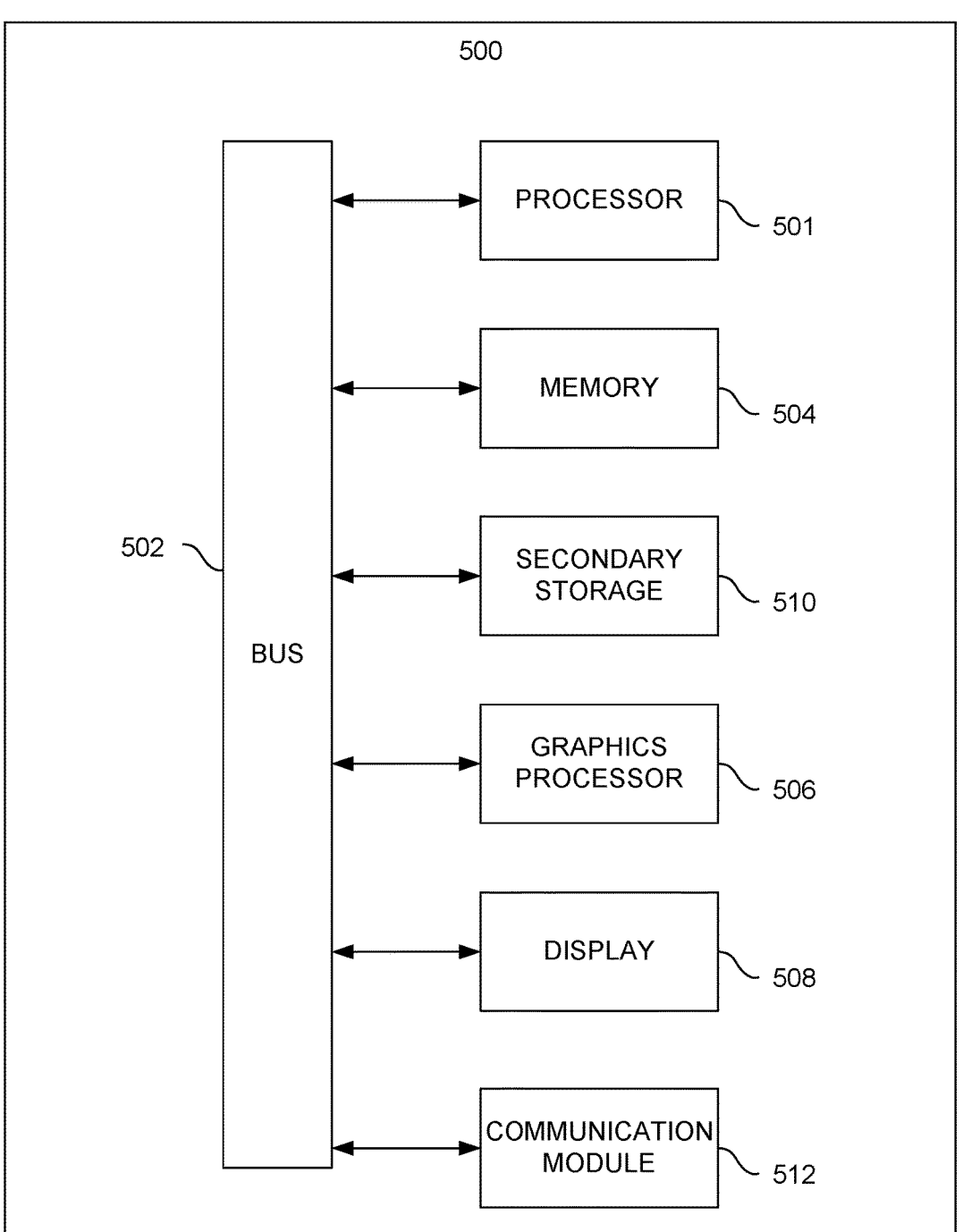
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

identify a dataset having an imbalanced distribution of data across a plurality of classes;

group the plurality of classes into a plurality of clusters, based on a defined criteria, such that each cluster in the plurality of clusters includes two or more classes in the plurality of classes that are balanced with respect to one another as determined based on the defined criteria;

train a plurality of machine learning models to classify data, each machine learning model of the plurality of machine learning models trained using a subset of the data in the dataset corresponding to a particular cluster of the plurality of clusters such that the machine learning model learns to classify data according to the two or more classes included in the particular cluster that are balanced with respect to one another as determined based on the defined criteria, wherein respectively training the plurality of machine learning models per cluster of the plurality of clusters eliminates bias that would otherwise be introduced in a machine learning model trained on the dataset with the imbalanced distribution of data across the plurality of classes; and process a given input through the plurality of trained machine learning models, in stages, until a classification for the given input is predicted.

2. The non-transitory computer-readable media of claim 1, wherein the defined criteria includes an initial criteria that includes at least one of:

a class hierarchy, a class proportion, a frequency in a defined time period, or a logical similarity.

3. The non-transitory computer-readable media of claim 2, wherein the defined criteria includes an additional criteria that groups all remaining classes not grouped according to the initial criteria.

4. The non-transitory computer-readable media of claim 2, wherein the initial criteria includes the class hierarchy, wherein the plurality of classes are grouped according to major classes and minor classes.

5. The non-transitory computer-readable media of claim 2, wherein the initial criteria includes the class proportion, wherein the plurality of classes are grouped by similar size.

6. The non-transitory computer-readable media of claim 2, wherein the initial criteria includes the frequency in a defined time period, wherein the plurality of classes are grouped by similar frequency.

7. The non-transitory computer-readable media of claim 1, wherein the plurality of clusters are ordered, such that the plurality of machine learning models are used according to the order of the plurality of clusters from which the plurality of machine learning models were trained.

8. The non-transitory computer-readable media of claim 1, wherein the grouping and the training is performed in stages.

9. The non-transitory computer-readable media of claim 8, wherein the grouping and the training includes:

selecting one or more classes of the data within the dataset from among the plurality of classes, based on the defined criteria;

training a first machine learning model, using the selected one or more classes of the data, for use in classifying a given input according to the one or more classes;

for remaining data within the dataset not classified according to the one or more classes, repeating the selecting and the training at least one additional time to form at least one second machine learning model for use in classifying the given input according to one or more additional classes.

10. The non-transitory computer-readable media of claim 1, wherein the grouping is performed, and after the grouping the training is performed.

11. The non-transitory computer-readable media of claim 1, wherein the device is further caused to:

output the classification precited for the given input.

12. A method, comprising:

at a computer system:

identifying a dataset having an imbalanced distribution of data across a plurality of classes;

grouping the plurality of classes into a plurality of clusters, based on a defined criteria, such that each cluster in the plurality of clusters includes two or more classes in the plurality of classes that are balanced with respect to one another as determined based on the defined criteria;

training a plurality of machine learning models to classify data, each machine learning model of the plurality of machine learning models trained using a subset of the data in the dataset corresponding to a particular cluster of the plurality of clusters such that the machine learning model learns to classify data according to the two or more classes included in the particular cluster that are balanced with respect to one another as determined based on the defined criteria, wherein respectively training the plurality of machine learning models per cluster of the plurality of clusters eliminates bias that would otherwise be introduced in a machine learning model trained on the dataset with the imbalanced distribution of data across the plurality of classes; and processing a given input through the plurality of trained machine learning models, in stages, until a classification for the given input is predicted.

13. The method of claim 12, wherein the defined criteria includes an initial criteria that includes at least one of:

a class hierarchy, a class proportion, a frequency in a defined time period, or a logical similarity.

14. The method of claim 13, wherein the defined criteria includes an additional criteria that groups all remaining classes not grouped according to the initial criteria.

15. The method of claim 12, wherein the plurality of clusters are ordered, such that the plurality of machine learning models are used according to the order of the plurality of clusters from which the plurality of machine learning models were trained.

16. The method of claim 12, wherein the grouping and the training is performed in stages.

17. The method of claim 12, wherein the grouping is performed, and after the grouping the training is performed.

18. A system, comprising:

a non-transitory memory storing instructions; and one or more processors in communication with the non-transitory memory that execute the instructions to:

identify a dataset having an imbalanced distribution of data across a plurality of classes;

group the plurality of classes into a plurality of clusters, based on a defined criteria, such that each cluster in the plurality of clusters includes two or more classes in the plurality of classes that are balanced with respect to one another as determined based on the defined criteria;

train a plurality of machine learning models to classify data, each machine learning model of the plurality of machine learning models trained using a subset of the data in the dataset corresponding to a particular cluster of the plurality of clusters such that the machine learning model learns to classify data according to the two or more classes included in the particular cluster that are balanced with respect to one another as determined based on the defined criteria, wherein respectively training the plurality of machine learning models per cluster of the plurality of clusters eliminates bias that would otherwise be introduced in a machine learning model trained on the dataset with the imbalanced distribution of data across the plurality of classes; and process a given input through the plurality of trained machine learning models, in stages, until a classification for the given input is predicted.

19. The non-transitory computer-readable media of claim 1, wherein the plurality of machine learning models are trained to predict which of a plurality of applications is responsible for a given defect for use in resolving the defect.

* * * * *